(No Model.) 3 Sheets—Sheet 1.
H. A. CHASE.
SYSTEM OF SIGNALING.
No. 474,945. Patented May 17, 1892.
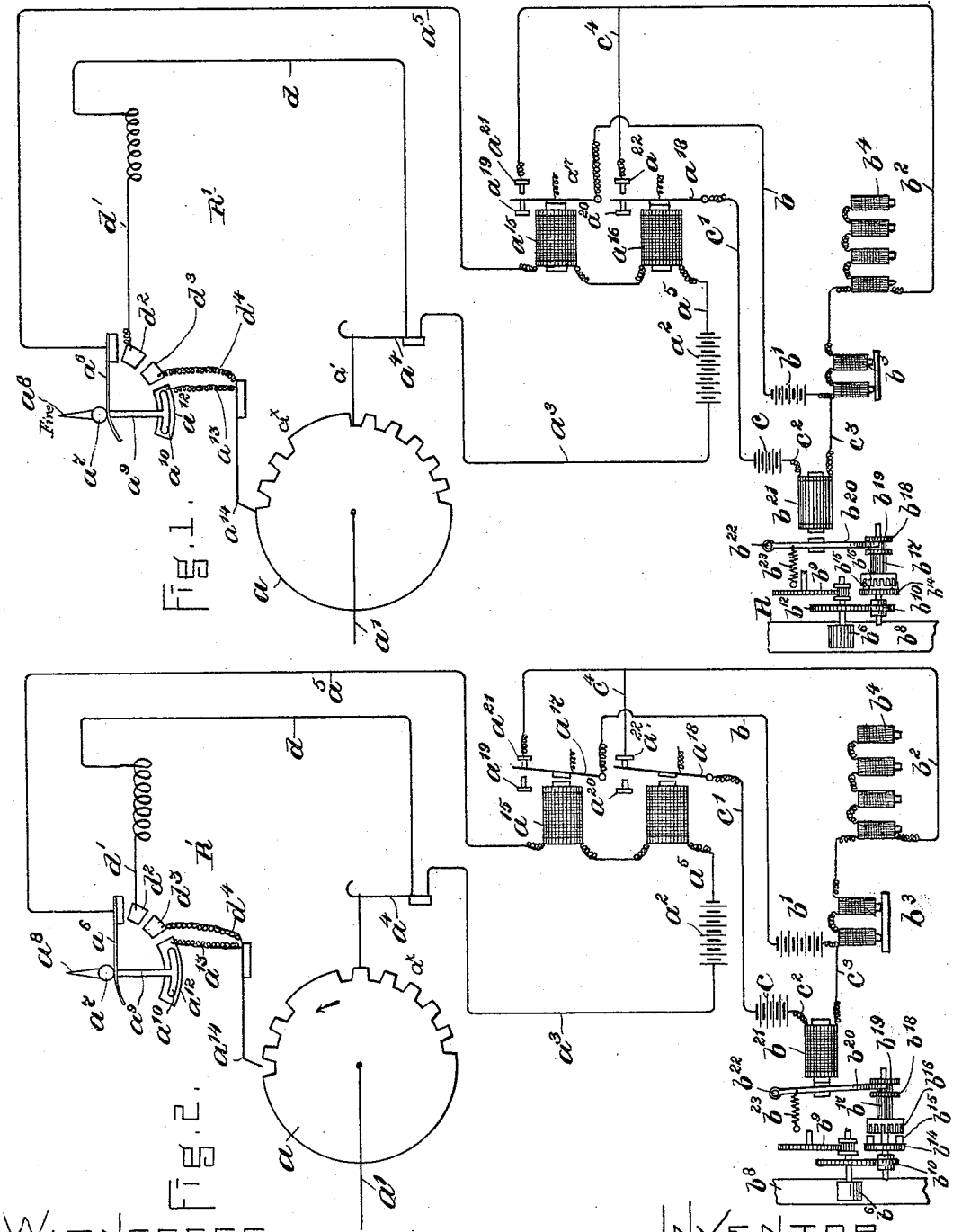
WITNESSES.
Henry Marsh.
S. H. Fearing.
INVENTOR.
Henry A. Chase
By Jas. H. Churchill
Atty.

(No Model.) 3 Sheets—Sheet 2.
H. A. CHASE.
SYSTEM OF SIGNALING.
No. 474,945. Patented May 17, 1892.
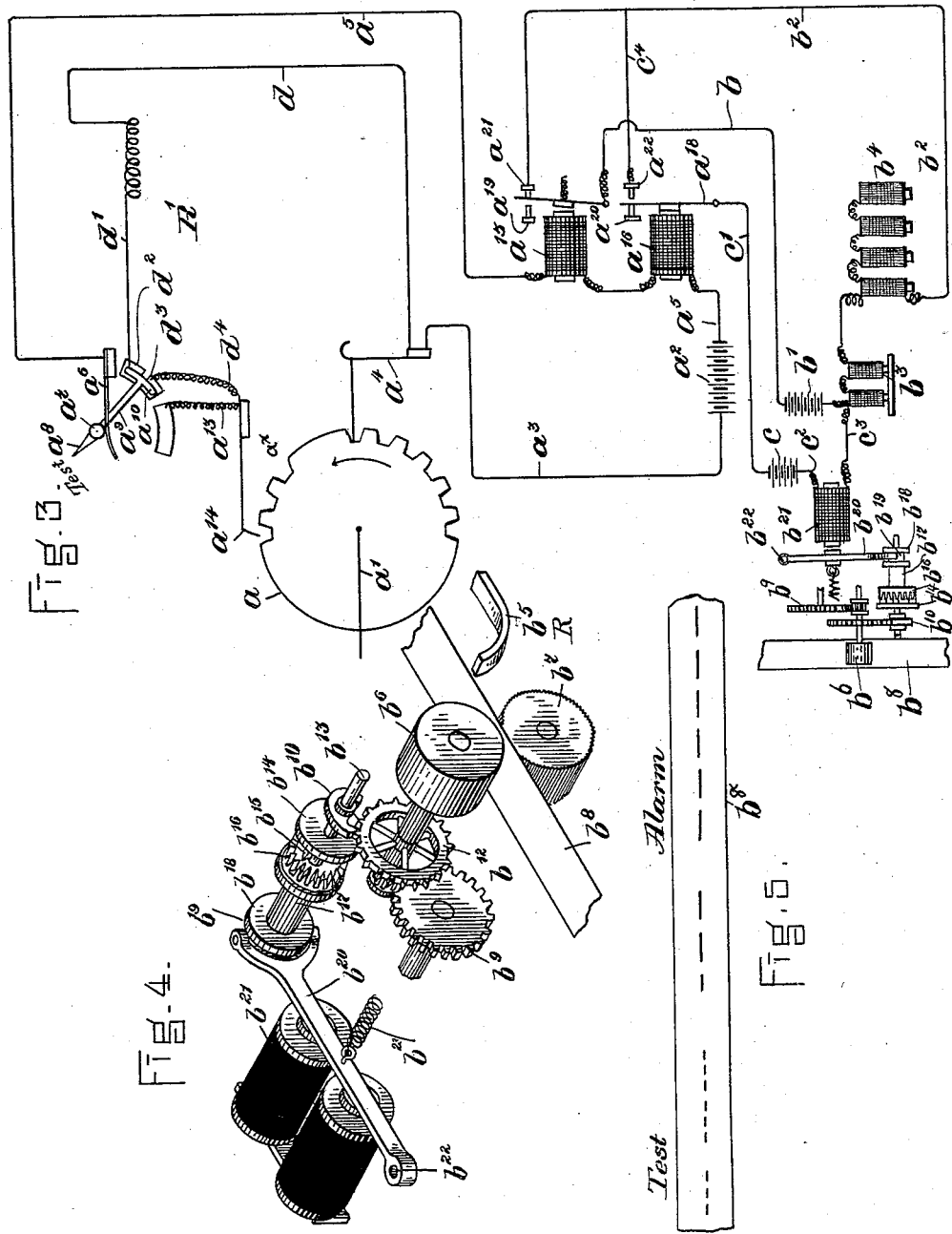

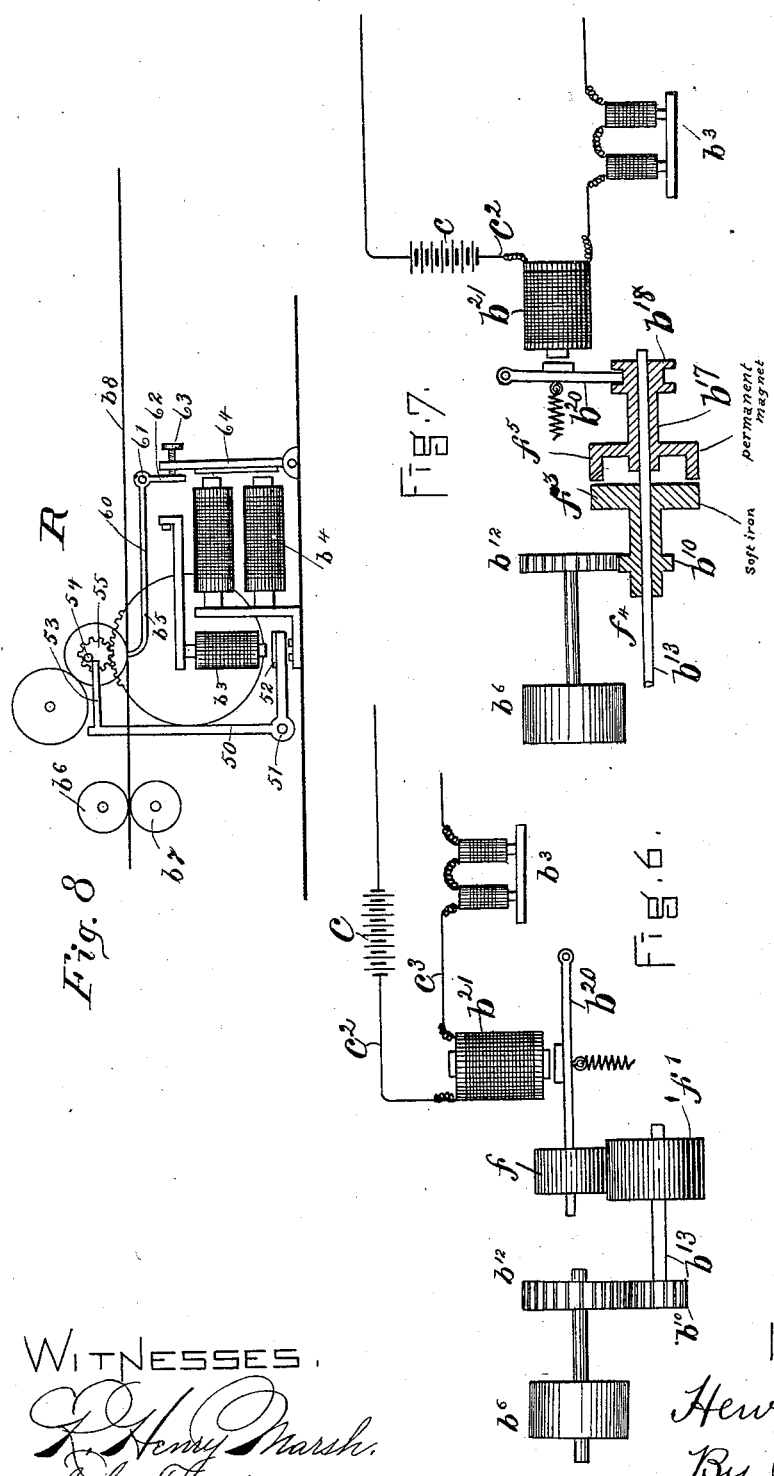

UNITED STATES PATENT OFFICE.

HENRY A. CHASE, OF BOSTON, MASSACHUSETTS, ASSIGNOR TO ALBERT WATTS, OF SAME PLACE.

SYSTEM OF SIGNALING.

SPECIFICATION forming part of Letters Patent No. 474,945, dated May 17, 1892.

Application filed December 18, 1891. Serial No. 415,472. (No model.)

*To all whom it may concern:*

Be it known that I, HENRY A. CHASE, residing in Boston, county of Suffolk, and State of Massachusetts, have invented an Improvement in Systems of Signaling, of which the following description, in connection with the accompanying drawings, is a specification, like letters on the drawings representing like parts.

This invention relates to a signaling system, and has for its object to provide a system of novel construction, as will be described, whereby the signal-transmitting mechanism may be made to indicate its signal by two different characters to denote two different purposes.

In another application, Serial No. 399,033, filed by me July 10, 1891, I have shown a signal-transmitting apparatus in which this result may be accomplished by changing the rate of movement of the signal-transmitting apparatus. In accordance with my present invention the signal-transmitting apparatus is designed to have a uniform or constant rate of movement and the change in the character of the signal is effected by changing the rate of movement of the recording mechanism or register, upon which the signal transmitted from the transmitting mechanism is received.

My invention in a signaling system, therefore, consists in the combination of the following instrumentalities, viz: a signal-transmitting mechanism, a signal receiving or recording mechanism, an electric circuit connecting said mechanisms, a motor mechanism to operate the receiving or recording mechanism, a speed-changing device to positively vary the rate of movement of the said motor mechanism and thereby the rate of movement of the receiving or recording mechanism, and means in the electric circuit to effect the operation of the speed-changing device, substantially as described.

Other features of my invention will be pointed out in the claims at the end of this specification.

Figure 1 is a diagram of circuits, showing a sufficient portion of a signaling system embodying my invention to enable it to be understood, the signal-transmitting mechanism being shown in its normal position. Fig. 2 is a like diagram of circuits, showing the signal-transmitting mechanism in the act of transmitting its signal for one purpose; Fig. 3, a diagram of circuits similar to that shown in Figs. 1 and 2, showing the transmitting mechanism in the act of transmitting its signal for a different purpose; Fig. 4, a detail in perspective of a sufficient portion of the recording mechanism or register to enable the operation of my improved system to be readily understood; Fig. 5, a detail of a portion of the recording strip or tape; Figs. 6 and 7, modifications to be referred to, and Fig. 8 a detail of a sufficient portion of a register to enable the operation of the starting and pen magnets to be understood.

Referring to Fig. 1, the transmitting mechanism, as herein represented, consists of a break-wheel $a$, provided on its periphery with a series of notches $a^x$, indicative of any desired number, herein shown as thirty-six. The break-wheel $a$ in practice is mounted upon a shaft $a'$, rotated by a motor mechanism of any usual or well-known construction, such as now commonly employed in fire-alarm systems and not herein shown. The break-wheel $a$ is normally included in a closed electric circuit, (herein shown as a metallic circuit or loop provided with a battery $a^2$,) having one of its poles, as the positive pole, connected by wire $a^3$ and brush $a^4$ to the shaft $a'$ and its other pole connected by line-wire $a^5$ to a circuit terminal or brush $a^6$, (represented in Fig. 1 as co-operating with the hub $a^7$ of a pointer $a^8$,) having secured to or forming part of it an arm $a^9$, provided with a contact brush or terminal $a^{10}$, which is normally in contact with the circuit-terminal plate or segment $a^{12}$, electrically connected by wire $a^{13}$ to a pen or brush $a^{14}$, normally in contact with the periphery of the break-wheel $a$, as represented in Fig. 1. The line-wire $a^5$ has included in it two electro-magnets or relays $a^{15}$ $a^{16}$, provided with armatures $a^{17}$ $a^{18}$, co-operating, respectively, with the front stops $a^{19}$ $a^{20}$ and with back stops $a^{21}$ $a^{22}$. The armature $a^{17}$ is joined by wire $b$ to one pole of the local battery $b'$, having its other pole connected by the wire $b^2$ with the back stop $a^{21}$ for the armature $a^{17}$, the wire $b^2$, having included in it one set of electro-magnets $b^3$ and another set of electro-magnets $b^4$, marked, respectively, "1," "2," "3," and "4." The electro-magnets $b^3$ constitute the starting-magnets for a register or signal receiving or recording mechanism of any usual or well-known construction, such as now commonly employed and only a portion of which is herein shown in Figs. 4 and 8 and designated by R. The electro-magnets $b^4$, marked, respectively, "1," "2," "3," and "4," are such as now commonly used in the register R and control the operation of the pens or marking devices, only one pen $b^5$ being represented in Figs. 4 and 8. I have represented the register as provided with four pen-magnets $b^4$, each of which in practice will be located in an independent local circuit.

The register R, as represented in Fig. 4, consists of the usual feed-rolls $b^6$ $b^7$, between which a recording tape, strip, or sheet $b^8$ is fed, and the usual motor mechanism or driving-gearing $b^9$, controlled in its operation by an escapement $b^{10}$, meshing with the escapement-wheel $b^{12}$.

The rate of movement of the motor mechanism referred to may be varied to impart to the feed-rolls of the recording mechanism different rates of movement by a speed-changing device (shown in Figs. 1 to 4, inclusive, as a clutch mechanism) consisting, as herein shown, of a disk $b^{14}$, fast on the escapement-shaft $b^{13}$ and provided with a tooth $b^{15}$, which is adapted to be engaged by a toothed hub $b^{16}$ on a sleeve $b^{17}$, loose on the shaft $b^{13}$ and provided with a hub $b^{18}$, having an annular groove $b^{19}$ to be engaged by the forked armature $b^{20}$ of an electro-magnet $b^{21}$, the said armature being pivoted, as at $b^{22}$, and adapted to be drawn away from its electro-magnet $b^{21}$ by the spring $b^{23}$. Normally the armature $b^{20}$ is retracted by its spring $b^{23}$, and the toothed hub $b^{16}$ is engaged with the tooth $b^{15}$ on the disk $b^{14}$, and in this way the sleeve $b^{17}$ and its hubs $b^{16}$ $b^{18}$ are made fast to the escapement-shaft $b^{13}$, so that the latter will oscillate at a substantially slow speed and the register mechanism will be rotated at a substantially slow speed to produce a substantially slow feed of the paper or recording-strip $b^8$. If the toothed hub $b^{16}$ be disengaged from the toothed disk $b^{14}$, the motor mechanism of the register will be permitted to revolve at an accelerated speed, and consequently a greater length of the recording strip or tape $b^8$ will be fed forward in a given length of time, and consequently if a pen-magnet, as $b^5$, should be in engagement with the recording-strip at the time the clutch-hub $b^{16}$ is disengaged from the disk $b^{14}$ a substantially long mark will be made upon the strip $b^8$, as represented at the right in Fig. 5. The disengagement of the clutch-hub $b^{16}$ from its co-operating toothed disk $b^{14}$ may be accomplished, as shown, by energizing the electro-magnet $b^{21}$ and at substantially the same time operating the register-starting magnet $b^3$ and its pen-magnet $b^4$.

Referring now to Fig. 2, I have shown the transmitting or break wheel $a$ in the act of transmitting a signal to the receiving-instrument R, which may be supposed to be located in a central office or station. It will be noticed that the circuit of the main-line battery $a^2$ is open at the transmitting mechanism, the pen or brush $a^{14}$ being out of contact with the periphery of the break-wheel $a$ and in notch $a^x$ of the said wheel. At each total break in the main line, as described, the relays $a^{15}$ $a^{16}$ are both demagnetized and the armatures $a^{17}$ $a^{18}$ are withdrawn into engagement with their back-stops $a^{21}$ $a^{22}$, thus closing the local circuit of the battery $b'$ and energizing the starting-magnet $b^3$ and the pen-magnet $b^4$, and also closing the local circuit containing the battery $c$ and the electro-magnet $b^{21}$, the battery $c$ having one of its poles connected by the wire $c'$ to the armature $a^{18}$ and its other pole connected by wire $c^2$ to the electro-magnet $b^{21}$, which is joined, as herein shown, by wire $c^3$ to the starting-magnet $b^3$, the circuit of the local battery $c$ being completed by the wire $b^2$ and branch wire $c^4$, joining the wire $b^2$ to the back-stop $a^{22}$.

Referring to Fig. 8, I have shown one form of starting mechanism by which the register is set in motion. The starting mechanism referred to consists of an elbow-lever 50, pivoted, as at 51, and having secured to one of its arms the armature 52 of the starting-magnet $b^3$, its other arm having secured to or forming part of it a detent-arm 53, normally in the path of movement of the detent lug or projection 54 on the pinion 55, forming part of the motor mechanism. Normally the arm 53 is in the path of movement of the lug 54; but when the starting-magnet $b^3$ is energized its armature 52 is attracted and the detent-arm 53 withdrawn from engagement with the lug 54, and thereby enabling the motor mechanism to operate to feed the tape $b^8$. As shown in Fig. 8, the pen $b^5$ is secured to or forms part of an elbow-lever 60, pivoted, as at 61, and having an arm 62, engaged by a set-screw 63 on the armature 64 of the pen-magnet $b^4$. As soon as the circuit of the local battery $c$ is closed, which is effected, as shown, by the armature $a^{18}$ coming in contact with its back-stop $a^{22}$, the electro-magnet $b^{21}$ is energized. The magnet $b^{21}$ when energized attracts its armature $b^{20}$ and disengages the clutch-hub $b^{16}$ from the toothed disk $b^{14}$, thereby permitting the register to run at an accelerated speed and feed the recording-tape $b^8$ faster, so that at each break in the main line occasioned by a notch $a^x$ in the transmitting-wheel $a$, passing under the pen or brush $a^{14}$, a substantially long mark will be made, and the signal indicated by the break-wheel $a$ will be recorded upon the strip $b^8$ in a series of long marks, which signal will indicate one purpose—as for instance, an alarm of fire. The electro-magnet $b^{21}$ may be made as a slow-acting or lagging electro-magnet, so as to hold its armature in its attracted position, and thus maintain the clutch-hub $b^{16}$ disengaged from the toothed disk $b^{14}$ until the complete signal indicated by the wheel $a$ has been received upon the register; or the electro-magnet $b^{21}$ may be made as a quick-acting magnet, in which case its armature $b^{20}$ will be retracted at each closure between the breaks in the signal transmitted by the wheel $a$. In this latter case the clutch-hub $b^{16}$ will be momentarily brought into engagement with its co-operating disk $b^{14}$, but will be immediately withdrawn from engagement with the disk $b^{14}$ at the next break in the main line occasioned by a notch in the signal-wheel $a$.

In order that the same signal-wheel $a$ may be utilized to transmit its signal for a different purpose—as, for instance, to designate a test without giving an alarm-signal—the register R is rotated at its normal or substantially slow speed, thereby effecting a feed of but a substantially small amount of the paper or tape $b^8$, so that the signal will be indicated by substantially short marks, as shown at the left in Fig. 5. This is accomplished, as herein shown, by closing only the local circuit of the starting-magnet $b^3$ and the pen-magnet $b^4$ when the signal-transmitting wheel $a$ is rotated, and maintaining open the local-circuit of the electro-magnet $b^{21}$. The relay $a^{16}$ in practice is constructed and adjusted so as to respond only to total breaks in the main line, whereas the relay $a^{15}$ is constructed and adjusted so as to respond to changes in current strength, as well as to total interruptions. The change in current strength may be effected, as herein shown, by the interposition in the main line of a resistance R', joined by wire $d$ to the pen or brush $a^4$ and by wire $d'$ to an independent contact plate or terminal $d^2$, located in the transmitting apparatus. The transmitting apparatus is also provided, as herein represented, with a second independent contact plate or terminal $d^3$, joined by wire $d^4$ to the pen or brush $a^{14}$, and when it is desired to send a test-signal the pointer $a^8$ is turned so as to bring the contact-brush $a^{10}$ into engagement with the circuit-terminals $d^2$ $d^3$, as represented in Fig. 3. With the pointer turned into the position shown in Fig. 3 the transmitting mechanism may be operated to transmit its signal to the central office or station and the break-wheel $a$ will transmit the signal indicated by its teeth or notches, which signal will be recorded upon the strip or tape $b^8$ in a series of substantially short marks, as represented at the left in Fig. 5, and the said signal will indicate a different purpose from the same signal when transmitted with the pointer in its normal position. When the test-signal is being sent, it will be noticed by referring to Fig. 3 that the main line remains closed when a notch $a^x$ in the break-wheel $a$ passes under the pen $a^{14}$, the circuit at such time being traced as follows: from the positive pole of the battery $a^2$, by wires $a^3$ and $d$, resistance R', wire $d'$, terminal $d^2$, contact-brush $a^{10}$, arm $a^9$, brush $a^6$, wire $a^5$, through the relays $a^{15}$ $a^{16}$ to the negative pole of the battery. It will be seen that the circuit of the relay $a^{16}$ remains intact and its armature $a^{18}$ is held away from its back stop $a^{22}$, thereby opening the circuit of the electro-magnet $b^{21}$, leaving the clutch-hub $b^{16}$ in engagement with the disk $b^{14}$ to effect the normal speed of the register. The relay $a^{15}$, being constructed and adjusted to respond to changes in current strength, permits its armature $a^{17}$ to be withdrawn into contact with its back-stop $a^{21}$ to close the local circuit of the battery $b'$, and thereby start the register in operation to effect a record of the signal in substantially short marks. It will thus be seen that the signal indicated by the break-wheel $a$ may be received at the central station in two different characters to indicate two different purposes and that this result may be accomplished without effecting any change in the rate of movement of the transmitting mechanism.

In Figs. 1 to 4 I have shown one form of speed-changing device by which the rate of movement of the register or recording mechanism may be effected, and while I may prefer to employ this form of speed-changing device I do not desire to limit myself in this respect, as speed-changing devices of other forms may be used—for instance, such as shown in Figs. 6 and 7.

Referring to Fig. 6, I have shown the speed-changing device as a mechanical brake mechanism, it consisting of a friction surface or hub $f$ on the armature $b^{20}$ of the electro-magnet $b^{21}$, and a friction surface or disk $f'$, fast on the escapement-shaft $b^{13}$. When the transmitting mechanism is at rest, the friction-hub $f$ is in contact with the friction-disk $f'$. If the transmitting apparatus should be operated with the pointer $a^8$ in its normal position, as shown in Fig. 1, a dead-break is made in the main line, and the local circuit of the magnet $b^{21}$ is closed and the said magnet is energized. The magnet $b^{21}$ when energized as described attracts its armature and removes the friction-hub $f$ from contact with the friction-disk $f'$, thus permitting the register R to be operated at its quick speed and the signal to be recorded in substantially long marks to indicate the alarm-signal. If the transmitting mechanism should be operated with the pointer in the position shown in Fig. 3 to send in a test signal, the circuit of the electro-magnet $b^{21}$ is maintained open, as above described, and its armature $b^{20}$ remains unattracted, so that the friction-hub $f$ is kept in contact with the friction-disk $f'$. When the friction-hub $f$ is in contact with the friction-disk $f'$, the rate of movement of the motor mechanism will be retarded, and consequently a substantially small amount of the tape will be fed forward, so that the signal produced will consist of a series of substantially short marks, as shown in Fig. 3, which signal will indicate the test, as above described.

Referring to Fig. 7, I have shown the speed-changing device as a magnetic brake, it consisting of a soft-iron disk $f^3$, fast to the escapement-pawl $b^{10}$, the said disk and pawl, as herein represented, being mounted upon a sleeve $f^4$, fast on the escapement-shaft $b^{13}$. The soft-iron disk $f^3$ has co-operating with it a permanent magnet, represented as a bar $f^5$ on the independent sleeve $b^{17}$, having the annularly-grooved collar or hub $b^{18}$, with which engages the armature $b^{20}$ of the electro-magnet $b^{21}$. When the transmitting mechanism is not in operation, the pointer $a^8$ occupies the position shown in Fig. 1 and the main-line circuit is closed, the armature $a^{18}$ is attracted by the relay $a^{16}$, and the local circuit of the magnet $b^{21}$ is open and the armature $b^{20}$ of said magnet is unattracted. The permanent magnet $f^5$ at such time stands substantially close to the soft-iron armature or disk $f^3$, and if the transmitting mechanism should be operated with the pointer in its normal position the magnet $b^{21}$ is energized by the closing of its local circuit and the sleeve $b^{17}$ is moved on the escapement-shaft, so as to withdraw the permanent magnet $f^5$ away from the soft-iron disk or armature $f^3$, and thereby weaken the magnetic field of the permanent magnet and withdraw the influence of the permanent magnet from the soft-iron armature. When in this condition, the recording mechanism will be operated at its accelerated or quick speed and the signal will be received upon the recording-tape in a series of substantially long marks to indicate the alarm-signal. If the transmitting mechanism should be operated with the pointer turned into the position shown in Fig. 3 to send in a test-signal, the circuit of the magnet $b^{21}$ not being closed, its armature will be retracted and the permanent magnet $f^5$ brought close to the soft-iron armature $f^3$, so that the said permanent magnet and its sleeve are magnetically clutched to the escapement-shaft. In this condition the recording mechanism will operate at a substantially slow rate and a substantially small amount of the recording-strip will be fed forward while the signal is being received, and the latter will be indicated upon the said strip in a series of short marks. It will be noticed that when the pointer is in its normal position (shown in Fig. 1) the signal is transmitted over one path, and when removed from its normal position into the position shown in Fig. 3 the signal is transmitted over another path, and that the speed-changing device effects the record of the signal in one set of characters when the signal is transmitted over one path and effects the record of the signal in a different set of characters when transmitted over the other path.

I claim—

1. In a signaling system, the combination of the following instrumentalities, viz: a signal-transmitting mechanism, a signal receiving or recording mechanism, an electric circuit connecting said mechanisms, a motor mechanism to operate the receiving or recording mechanism, a speed-changing device to positively vary the rate of movement of the said motor mechanism, and thereby the rate of movement of the receiving or recording mechanism, and means in the electric circuit to effect the operation of the speed-changing device, substantially as described.

2. In a signaling system, the combination of the following instrumentalities, viz: an electric circuit, a signal-transmitting mechanism included therein and having a uniform or constant rate of movement, a signal-recording mechanism or register included in said circuit and upon which is received the signal transmitted by the transmitting mechanism, a positively-acting speed-changing device for changing the speed of the recording mechanism, and an electro-magnet to operate the speed-changing device to effect a change of speed in the recording mechanism, whereby the signal-transmitting mechanism may have its signal recorded in two different characters, substantially as described.

3. In a signaling system, the combination of the following instrumentalities, viz: an electric circuit, a signal-transmitting mechanism included therein, two relays in said circuit, one of which is responsive to changes in current strength and the other of which is responsive to total interruptions in the circuit, two independent local circuits controlled by said relays, a recording mechanism or register provided with a starting-magnet and a pen-magnet included in the local circuit controlled by the relay responsive to changes in current strength, a speed-changing device to vary the rate of movement of the recording mechanism or register, and an electro-magnet to operate said speed-changing device included in the local circuit, controlled by the relay, responsive to total interruptions in the circuit, substantially as described.

4. In a signaling system, the combination of the following instrumentalities, viz: an electric circuit, a signal-transmitting mechanism included therein, a signal-recording mechanism, a motor mechanism to operate it, and a speed-changing device for the motor mechanism, controlled in its operation by the transmitting mechanism to positively vary the rate of movement of the recording mechanism, substantially as described.

5. In a signaling system, the combination of the following instrumentalities, viz: a main electric circuit, a signal-transmitting mechanism included therein and consisting of a break-wheel $a$, a pen or brush $a^{14}$, co-operating therewith, circuit-terminals $a^{12}$ $d^3$, to which the said pen is connected, an independent circuit-terminal $d^2$, a pointer and a contact-brush movable with said pointer and co-operating with the said circuit-terminals, a resistance $R'$, connected to the circuit-terminal $d^2$, a relay $a^{16}$ in the main electric circuit responsive to total interruptions in the said circuit, a second relay $a^{15}$, responsive to changes in current strength, a local circuit controlled by the relay $a^{15}$, a recording mechanism or register having a starting-magnet and its pen-magnet included in said local circuit, a speed-changing device to vary the rate of movement of the said register, an electro-magnet to operate said speed-changing device, and a local circuit in which the said electro-magnet is located and controlled by the relay $a^{16}$, substantially as described.

6. In a signaling system, the combination of the following instrumentalities, viz: a signal-transmitting mechanism, an electric circuit provided with two paths for the transmission of the signal indicated by the said transmitting mechanism, a signal receiving or recording mechanism controlled by the transmitting mechanism, and a speed-changing device to effect the record of the signal indicated by the transmitting mechanism in one set of characters when the said signal is transmitted over one path and to effect the record of the said signal in a different set of characters when transmitted over the other path, substantially as described.

In testimony whereof I have signed my name to this specification in the presence of two subscribing witnesses.

HENRY A. CHASE.

Witnesses:
JAS. H. CHURCHILL,
SADIE C. FEARING.